US012790813B2

(12) United States Patent
Norris

(10) Patent No.: US 12,790,813 B2
(45) Date of Patent: Nov. 10, 2026

(54) PORTABLE FOLDABLE BLIND

(71) Applicant: Loren Norris, Helen, GA (US)

(72) Inventor: Loren Norris, Helen, GA (US)

(*) Notice: Subject to any disclaimer, the term of this patent is extended or adjusted under 35 U.S.C. 154(b) by 197 days.

(21) Appl. No.: 18/895,134

(22) Filed: Sep. 24, 2024

(65) Prior Publication Data

US 2026/0085544 A1 Mar. 26, 2026

(51) Int. Cl.

| | |
|---|---|
| ***E04B 1/344*** | (2006.01) |
| ***A01M 31/02*** | (2006.01) |
| ***E04B 1/343*** | (2006.01) |
| ***E04H 15/00*** | (2006.01) |
| ***E04H 15/48*** | (2006.01) |

(52) U.S. Cl.

CPC ......... *E04B 1/3445* (2013.01); *A01M 31/025* (2013.01); *E04B 1/34321* (2013.01); *E04B 1/344* (2013.01); *E04H 15/001* (2013.01); *E04H 15/008* (2013.01); *E04H 15/48* (2013.01); *Y10S 135/901* (2013.01)

(58) Field of Classification Search

CPC ..... E04H 15/48; E04H 15/008; E04H 15/001; E04B 1/34321; E04B 1/344; E04B 1/3445; Y10S 135/901; A01M 31/025

USPC ............................ 135/143, 901; 52/71, 79.5

See application file for complete search history.

(56) References Cited

U.S. PATENT DOCUMENTS 1,285,467 A * 11/1918 Thiessen et al. ....... E04B 1/345 52/71
1,500,266 A * 7/1924 Primm, Sr. .............. A01K 1/02 119/500
1,918,375 A * 7/1933 Bowersock ........... E04B 1/3445 446/109
2,883,713 A * 4/1959 Zug ....................... E04B 1/3445 52/264
3,231,942 A * 2/1966 O'Brien ............... A63H 33/008 446/478
4,467,572 A * 8/1984 Somers ................ A63H 33/008 16/225
5,609,003 A * 3/1997 Jouty .................. E04B 1/34321 52/285.4
9,416,528 B2 * 8/2016 Schaffert ............... E04B 1/3445
9,441,358 B2 * 9/2016 Hartman ............. E04B 1/34336
11,020,681 B2 * 6/2021 Rieber .................... F16C 11/04
2005/0044804 A1 * 3/2005 Bin ....................... E04B 1/3445 52/79.5
2010/0050556 A1 * 3/2010 Burns ................. E04B 1/34321 52/592.1

FOREIGN PATENT DOCUMENTS

WO WO-2016174556 A1 * 11/2016 ........... A63H 33/008

* cited by examiner

*Primary Examiner* — Robert Canfield

(74) *Attorney, Agent, or Firm* — Joseph R. Englander; Lewis, Brisbois, Bisgaard & Smith LLP

(57) ABSTRACT

A portable foldable blind has a has a bottom frame, first and second side panels, a front side and a back side. The blind also includes fascia elements over the front and back sides. The blind has inner roof frames which support the fascia elements and outer roof frames. The outer roof frames have handle portions. During deployment or folding, the outer roof frames can be braced against the sides of the blind to provide an alternative usage and to improve the ability for users to deploy the fascia elements.

17 Claims, 19 Drawing Sheets

PORTABLE FOLDABLE BLIND

TECHNICAL FIELD

The field of the invention generally relates to structures, and more particularly to portable foldable blinds such as hunting blinds.

BACKGROUND

Portable blinds are used to help hunters conceal themselves from prey. Often portable blinds are flimsy. A sturdy blind would help hunters in case of bad weather, especially high winds. However, a sturdy blind can be bulky and difficult to transport. Also it can be difficult to install or take down at a selected hunting spot. Furthermore, portable blinds may have low ceilings, which do not have fascia to protect users within the blind and provide them with a taller structure for their comfort. Accordingly, a portable foldable blind which overcomes some or all of the deficiencies or drawbacks associated with the current art is desired.

SUMMARY

In one aspect of the invention, a portable foldable blind frame is provided having a deployed position and a folded position, and a transition between the deployed position and the folded position. The blind has a bottom frame, first and second side panels, a front side and a back side. The blind also includes fascia elements over the front and back sides. The blind has inner and outer roof frames. The inner roof frames supports the fascia elements and the outer roof frames. The outer roof frames can be braced against the sides of the blind as the blind transitions to or from its deployed or folded state. The bracing improves the ability for users to deploy the fascia elements.

DETAILED DESCRIPTION

Figure 1A:
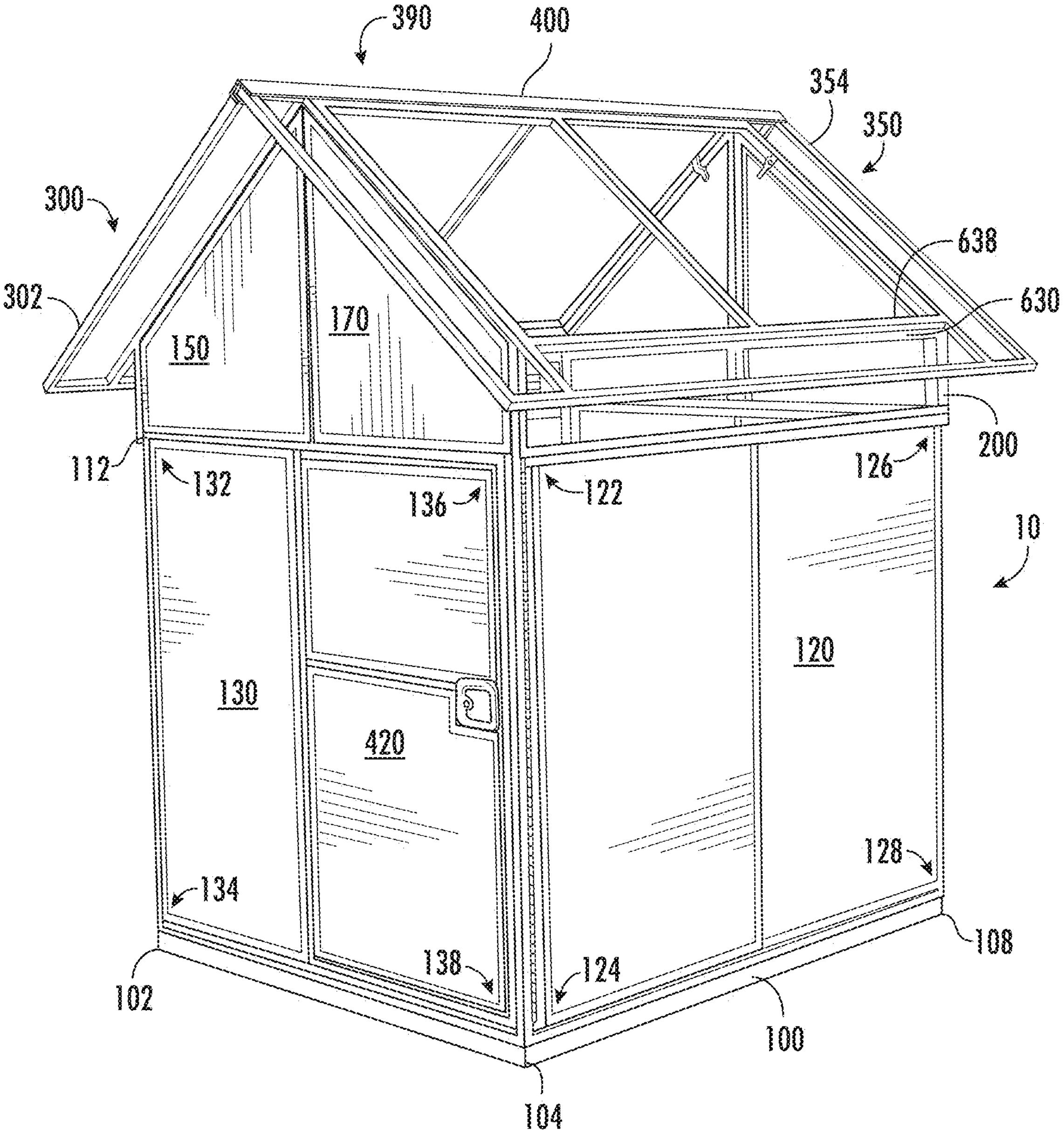
FIG. 1A depicts a front perspective view of an example of a portable foldable blind constructed in accordance with one embodiment of the invention in a fully deployed configuration.
Figure 1B:
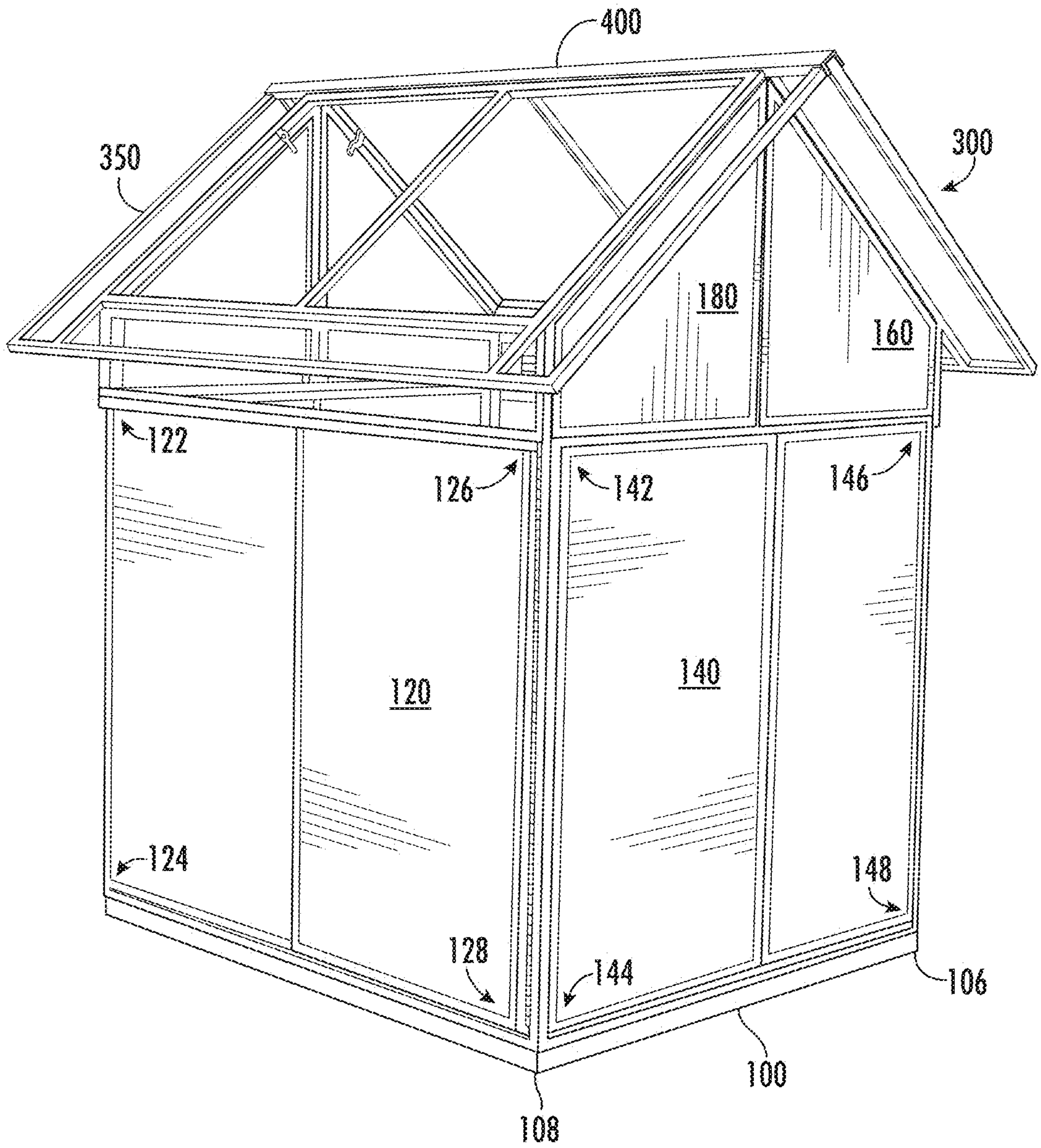
FIG. 1B depicts a rear perspective view of an example of the portable foldable blind constructed in accordance with one embodiment of the invention in a fully deployed configuration.
Figure 1C:
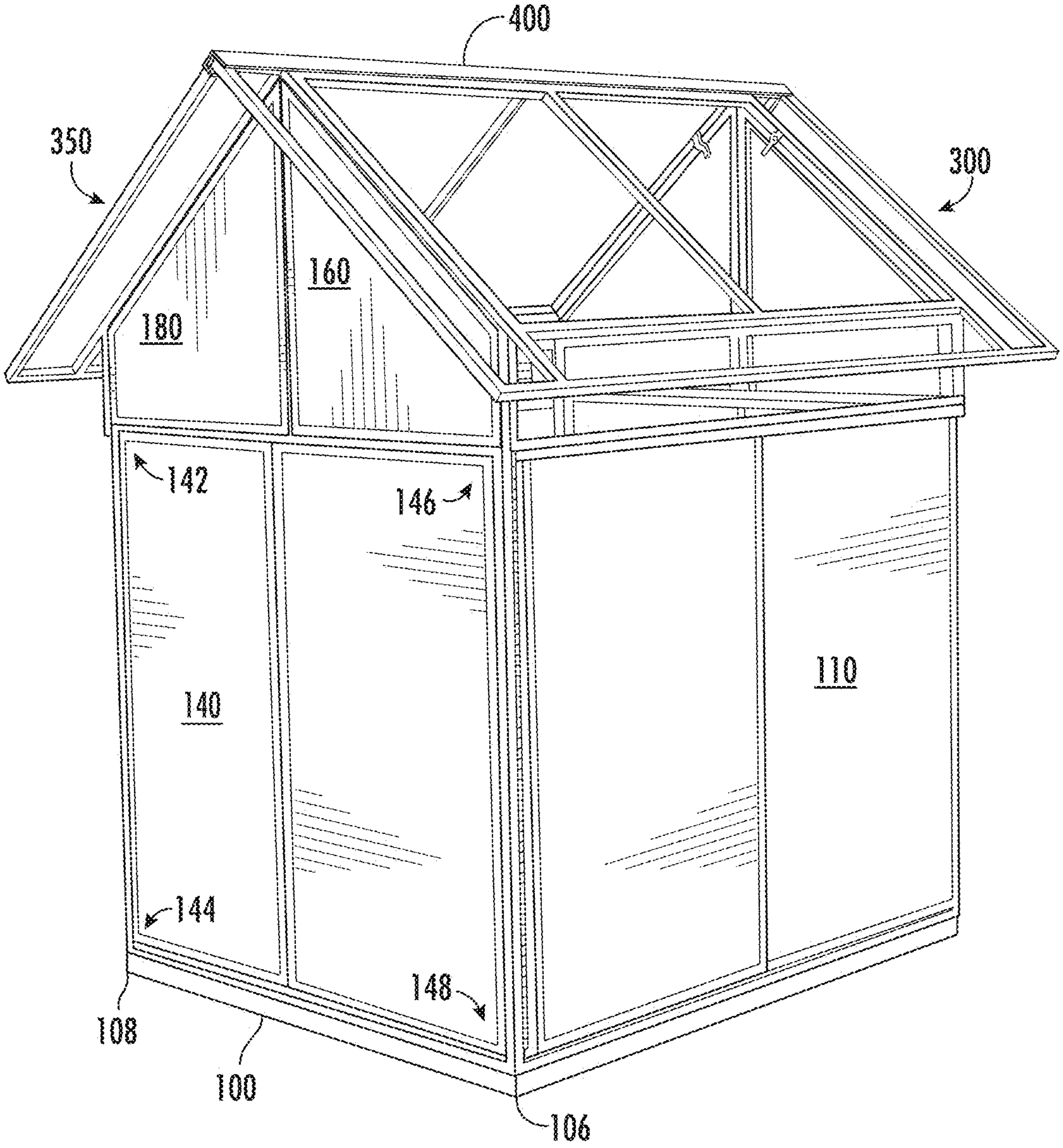
FIG. 1C depicts an additional rear perspective view of an example of the portable foldable blind constructed in accordance with one embodiment of the invention in a fully deployed configuration.
Figure 2A:
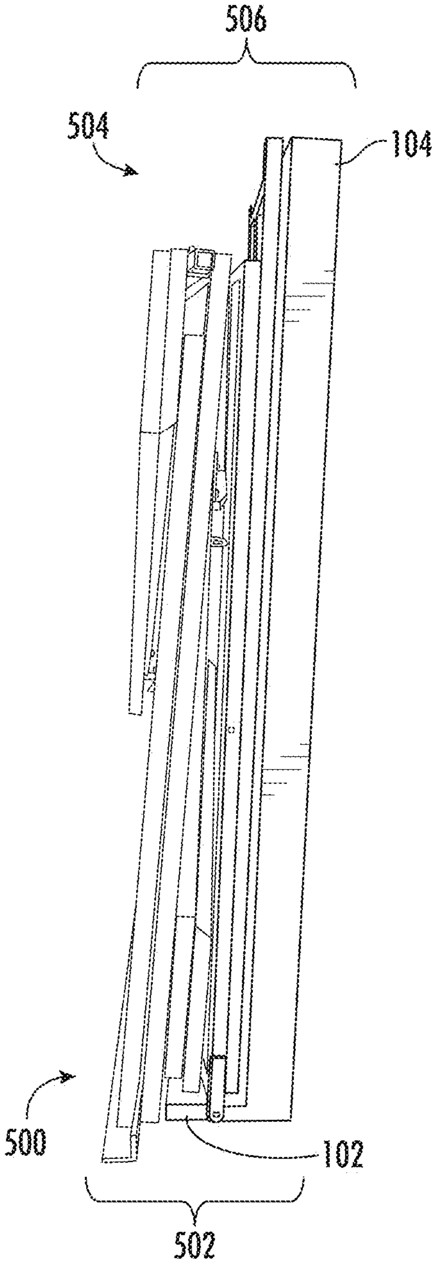
FIG. 2A depicts a front elevation view of an example of the portable foldable blind constructed in accordance with one embodiment of the invention in a folded configuration.
Figure 2B:
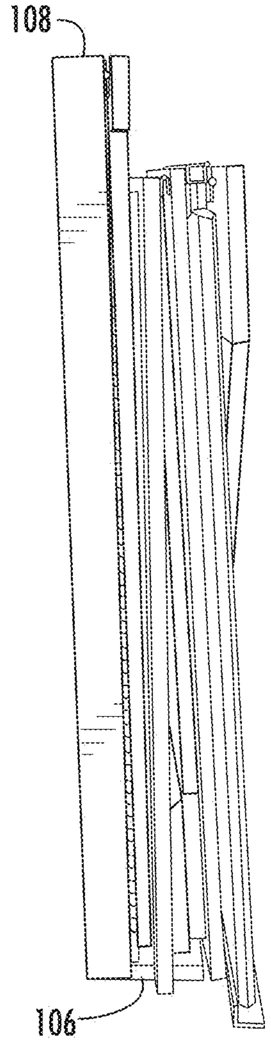
FIG. 2B depicts a rear elevation view of an example of the portable foldable blind constructed in accordance with one embodiment of the invention in a folded configuration.
Figure 3:
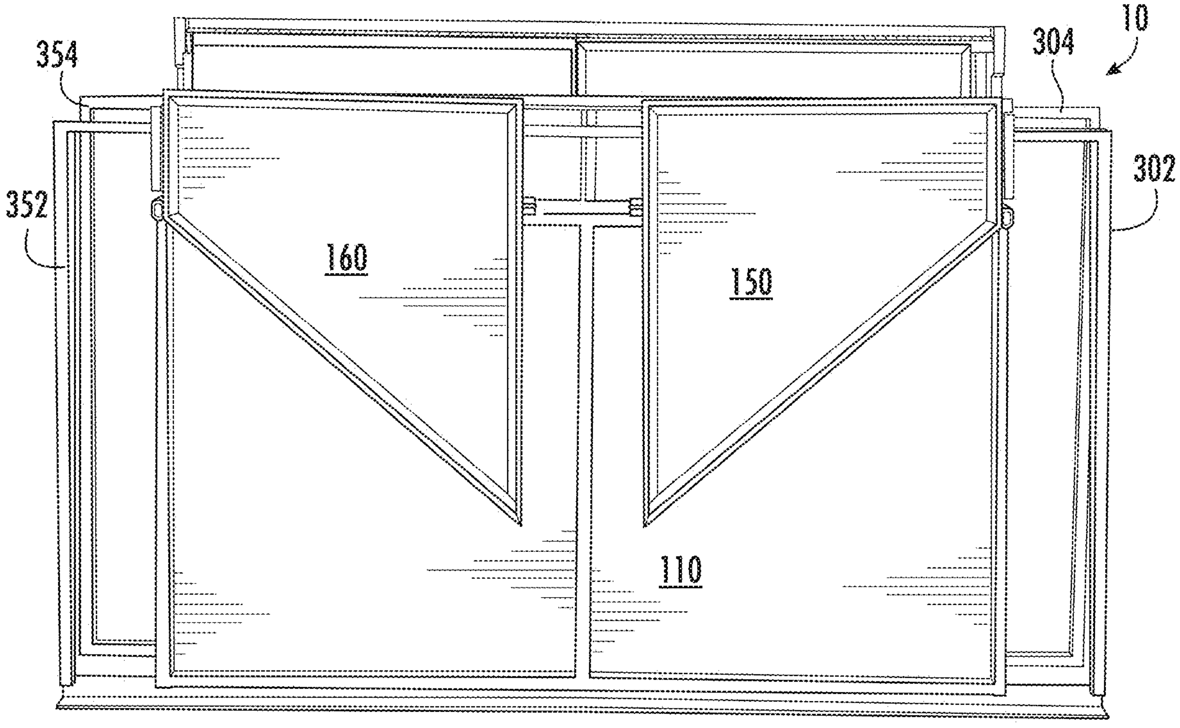
FIG. 3 depicts a side perspective view of an example of the portable foldable blind constructed in accordance with one embodiment of the invention in a folded configuration.
Figure 4A:
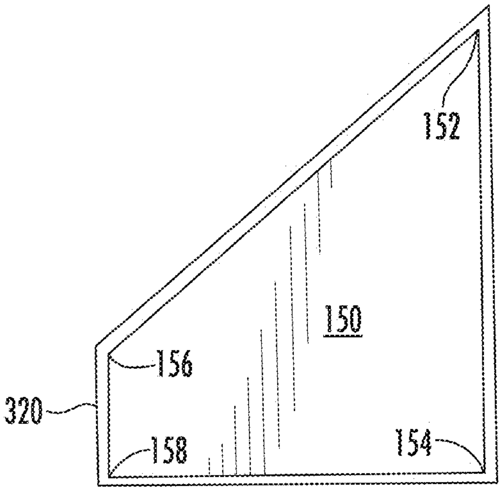
FIG. 4A depicts a front view of a first side front fascia of the portable foldable blind constructed in accordance with one embodiment of the invention.
Figure 4B:
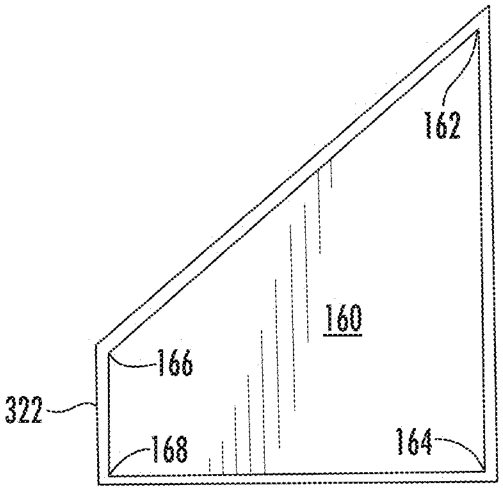
FIG. 4B depicts a front view of a first side back fascia of the portable foldable blind constructed in accordance with one embodiment of the invention.
Figure 4C:
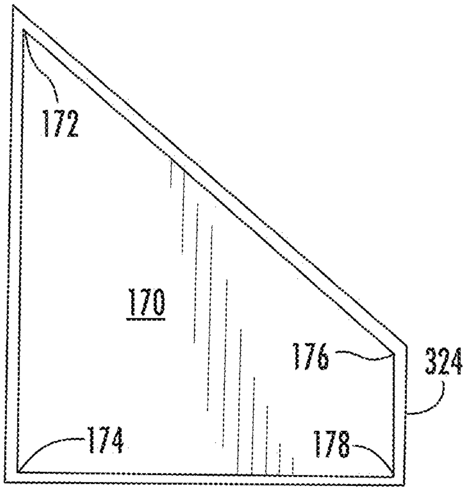
FIG. 4C depicts a front view of a second side front fascia of the portable foldable blind constructed in accordance with one embodiment of the invention.
Figure 4D:
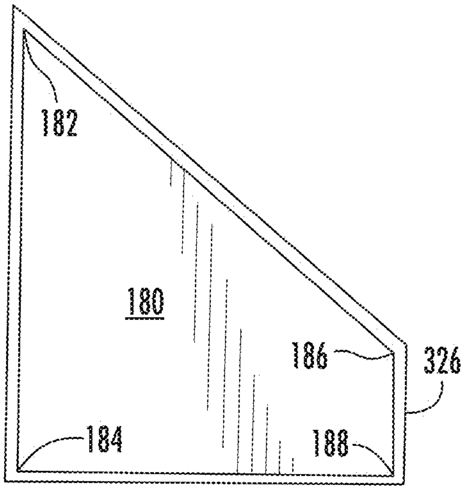
FIG. 4D depicts a front view of a second side back fascia of the portable foldable blind constructed in accordance with one embodiment of the invention.
Figure 20:
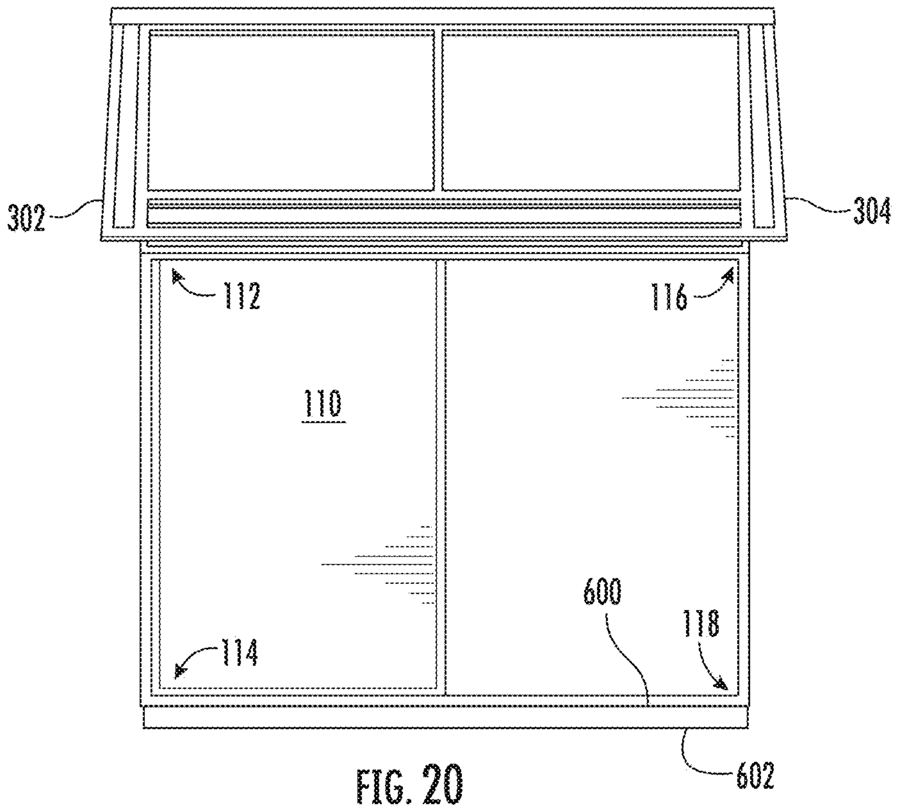
FIG. 20 is a side elevation view of the first side of a fully deployed portable foldable blind constructed in accordance with one embodiment of the invention.
Figure 21:
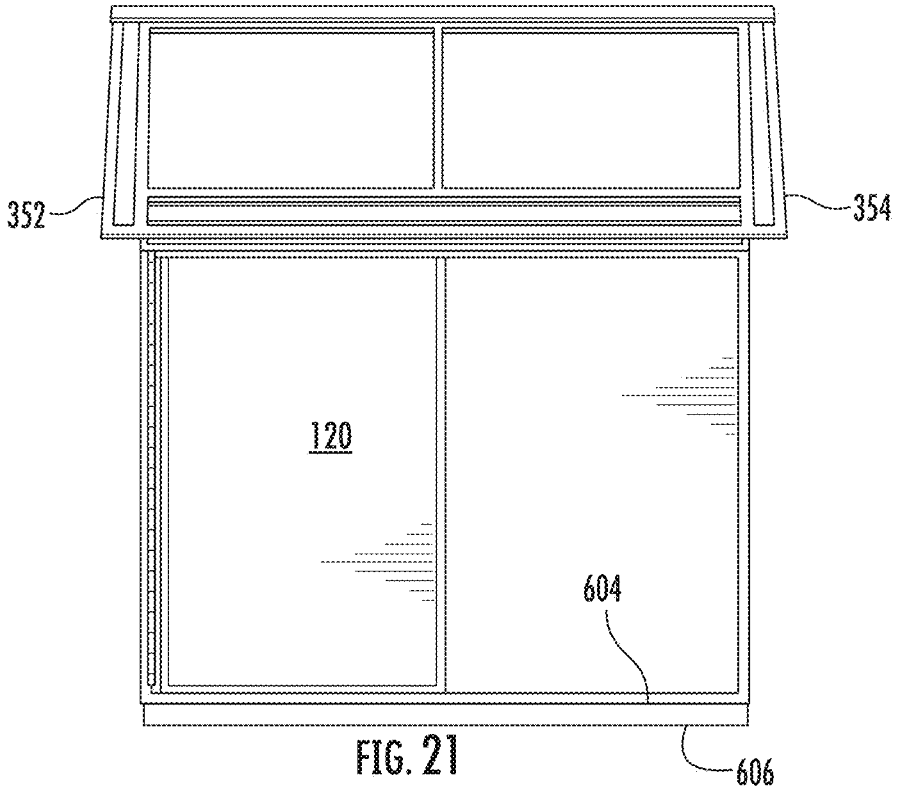
FIG. 21 is a side elevation view of the second side of a fully deployed portable foldable blind constructed in accordance with one embodiment of the invention.
Figure 22:
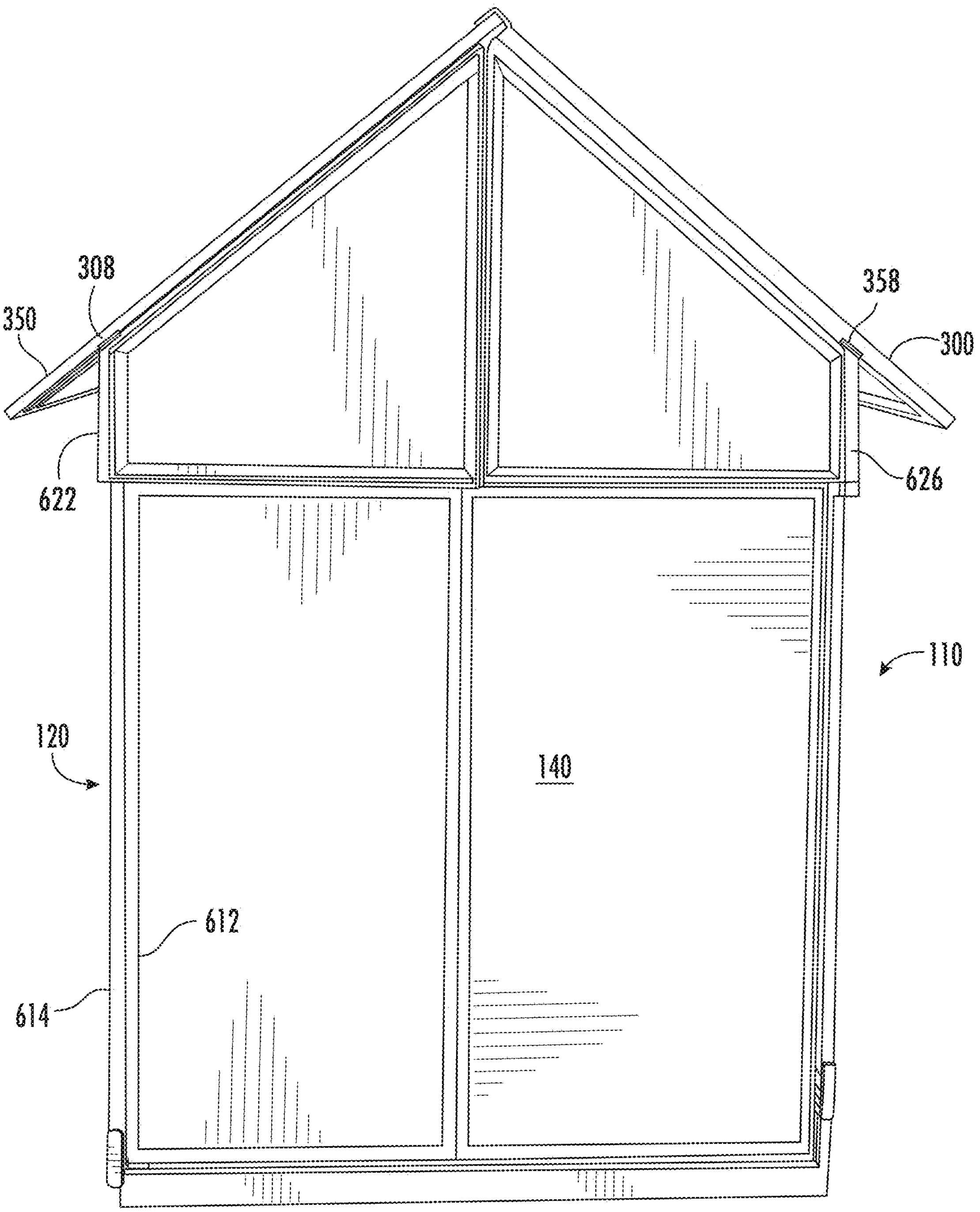
FIG. 22 is a rear elevation view of a fully deployed portable foldable blind constructed in accordance with one embodiment of the invention.

Reference is first made to FIGS. 1A through 1C in which an embodiment of a portable foldable blind generally indicated as 10 is shown in a deployed configuration. FIGS. 2 and 3 depict views of the portable foldable blind 10 in a folded configuration. FIGS. 4A through 4D depict fascia elements 150, 160, 170, 180 of the invention. FIGS. 5 through 6 depict roof frame elements 190, 200 of the invention. FIGS. 7 through 19 depict the transition of the blind 10 from folded configuration to deployed configuration. In reverse order, FIGS. 7 through 19 would also illustrate the transition of the blind from the deployed configuration to the folded configuration. FIGS. 20 through 22 depict views of the fully deployed configuration.

Blind 10, as shown in FIGS. 1A through 1C includes a bottom frame 100. The bottom frame may be rigid or semirigid, and made at least in part by metal or composite or a similar material. The bottom frame 100 has a frame front first corner 102, a frame front second corner 104, a frame back first corner 106 and a frame back second corner 108. As illustrated in FIGS. 2 and 3, the frame front first corner 102 and the frame back first corner 106 extend perpendicularly from bottom frame 100 at a higher position on the bottom frame 100 than the frame front second corner 104 and the frame back second corner 108.

Thus, when the foldable blind is in a folded configuration as shown in FIGS. 2 and 3, the first folded side 500 will have a first folded side height 502, and the second folded side 504 will have a second folded side height 506. The first folded side height 502 and the second folded side height 504 will be approximately equal, allowing for easier portability.

The foldable blind 10 includes a first side panel 110, a second side panel 120, a front panel 130 and a back panel 140. The panels each are rigid or semirigid in circumference, and made at least in part by metal or composite or a similar material. One or more of the side panels 110, 120, 130, 140 may include an attached generally flat outer surface, which may be opaque, translucent or clear and may be rigid, semirigid or plastic. Alternatively, the side panels may be open frames without a generally flat outer surface.

The first side panel 110 includes a first side panel front top corner 112, a first side panel front bottom corner 114, a first side panel back top corner 116 and a first side panel back bottom corner 118.

The second side panel 120, has a second side panel front top corner 122, a second side panel front bottom corner 124, a second side panel back top corner 126 and a second side panel back bottom corner 128.

The front panel 130, has a front panel first side top corner 132, a front panel first side bottom corner 134, a front panel second side top corner 136 and a front panel second side bottom corner 138.

The back panel 140, has a back panel first side top corner 142, a back panel first side bottom corner 144, a back panel second side top corner 146 and a back panel second side bottom corner 148. As described herein, panels may be alternatively be attached to each other and the frame at corners or along edges.

In a preferred non-limiting embodiment, as shown in FIG. 20, the first side panel front bottom corner 114 is pivotally attached to the frame front first corner 102, and the first side panel back bottom corner 118 is pivotally attached to the frame back first corner 106. Alternatively, as shown in FIG. 20, at least a portion of the bottom edge 600 of the first side panel 110 may be pivotally attached to at least a portion of the first side edge 602 of the bottom frame 100. Pivotal attachment may be made by using hinges or other means known in the art.

As shown in FIG. 1A, the frame front second corner 104 is pivotally attached to the second side panel front bottom corner 124, and the frame back second corner 108 is pivotally attached to the second side panel back bottom corner 128. Alternatively, as shown in FIG. 21, a bottom edge 604 of the second side panel 170 may be pivotally attached to a second side edge 606 of the bottom frame 100. Pivotal attachment may be made by using hinges or other means known in the art.

Figure 9:
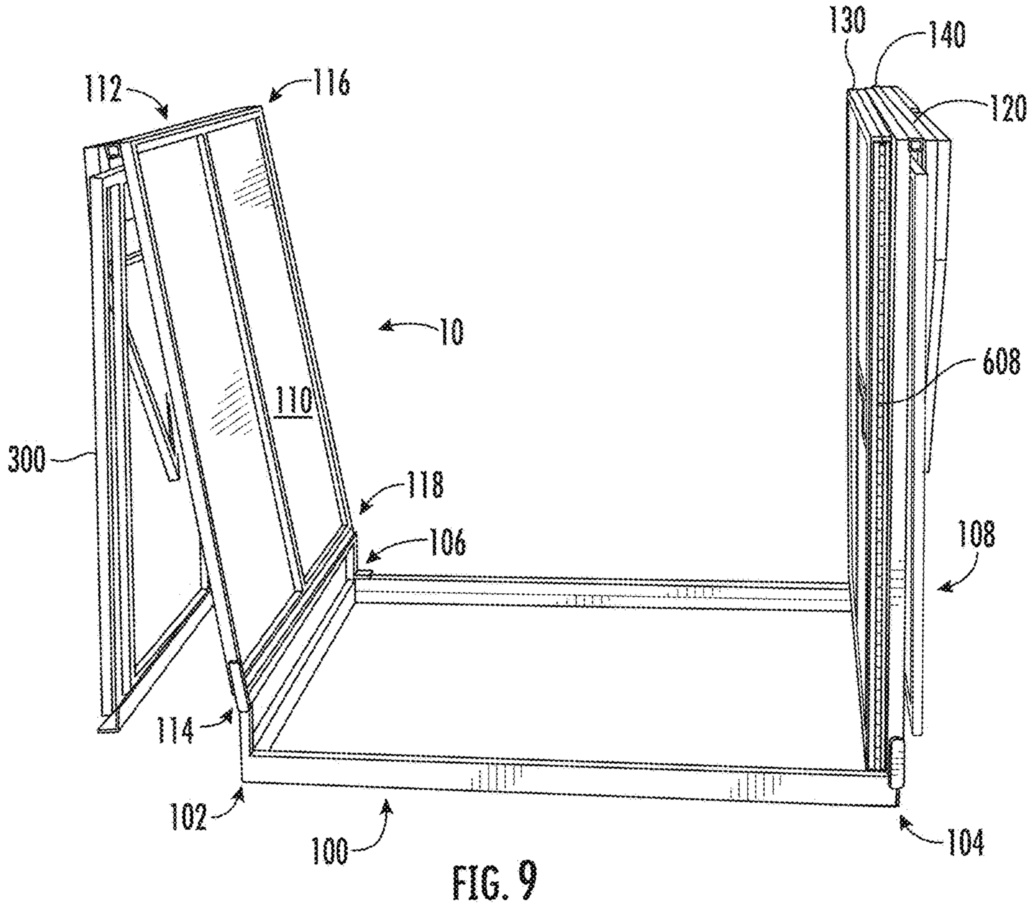
FIG. 9 depicts a front perspective view of the portable foldable blind constructed in accordance with one embodiment of the invention in a partially deployed configuration with a first side panel and a second side panel deployed.
Figure 10:
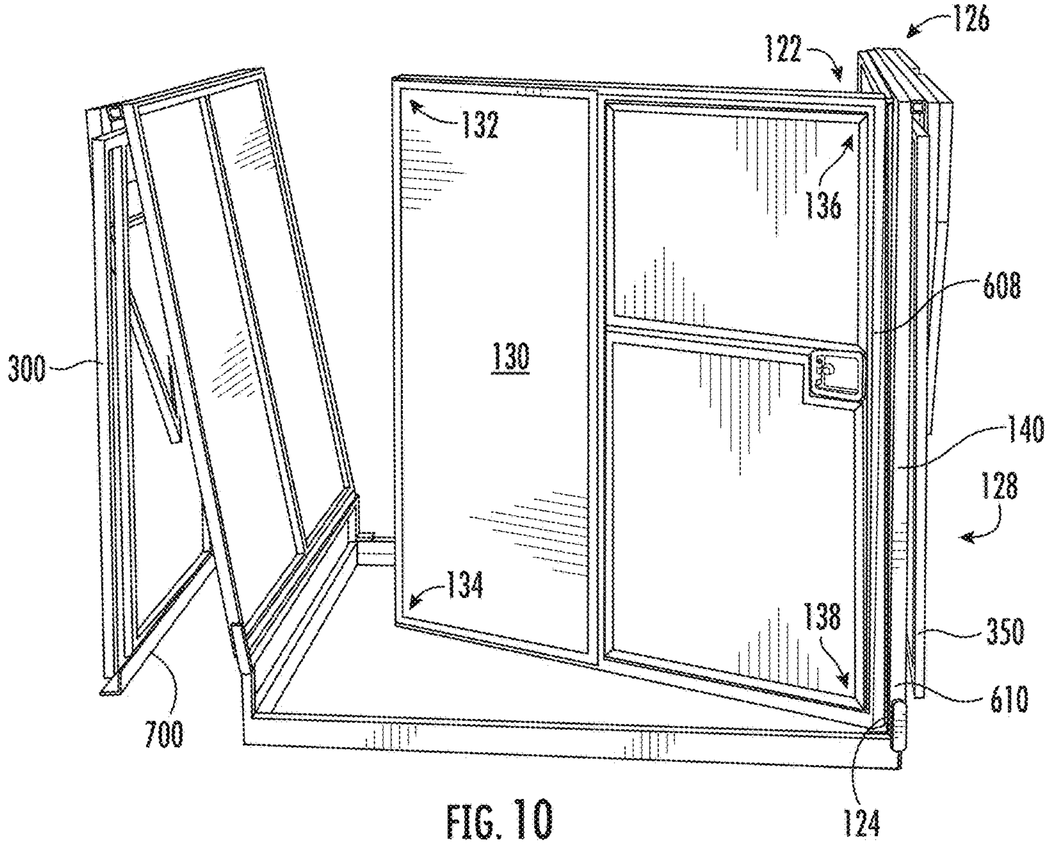
FIG. 10 depicts a front perspective view of the portable foldable blind constructed in accordance with one embodiment of the invention in a partially deployed configuration with a first side panel and a second side panel deployed and a front panel partially deployed.

The front panel 130 is pivotally attached to the second side panel 120. As shown in FIGS. 9 and 10, a second side edge 608 of the front panel 130 may be pivotally attached to a front edge 610 of the second side panel 120. Additionally, the second side panel front top corner 122 and the second side panel front bottom corner 124 are pivotally attached to the front panel second side top corner 136 and the front panel second side bottom corner 138, respectively. Pivotal attachment may be made by using hinges or other means known in the art.

The back panel 140 is also pivotally attached to the second side panel 120. As shown in FIG. 22, a second side edge 612 of the back panel 140 may be pivotally attached to a back edge 614 of the second side 120. Additionally, the second side panel back top corner 126 and the second side panel back bottom corner 128 are pivotally attached to the back panel second side top corner 146 and the back panel second side bottom corner 148, respectively. Pivotal attachment may be made by using hinges or other means known in the art.

As shown further in FIGS. 4A through 4D, the foldable blind 10 includes fascia elements including a front first side fascia 150, a back first side fascia 160, a front second side fascia 170 and a back second side fascia 180. The fascia each are rigid or semirigid in circumference, and made at least in part by metal or composite or a similar material.

The front first side fascia 150 has a front first side fascia inner top corner 152, a front first side fascia inner bottom corner 154, a front first side fascia outer top corner 156 and a front first side fascia outer bottom corner 158. The back first side fascia 160, has a back first side fascia inner top corner 162, a back first side fascia inner bottom corner 164, a back first side fascia outer top corner 166 and a back first side fascia outer bottom corner 168. The front second side fascia 170, has a front second side fascia inner top corner 172, a front second side fascia inner bottom corner 174, a front second side fascia outer top corner 176 and a front second side fascia outer bottom corner 178. The back second side fascia 180, has a back second side fascia inner top corner 182, a back second side fascia inner bottom corner 184, a back second side fascia outer top corner 186 and a back second side fascia outer bottom corner 188.

Figure 5A:
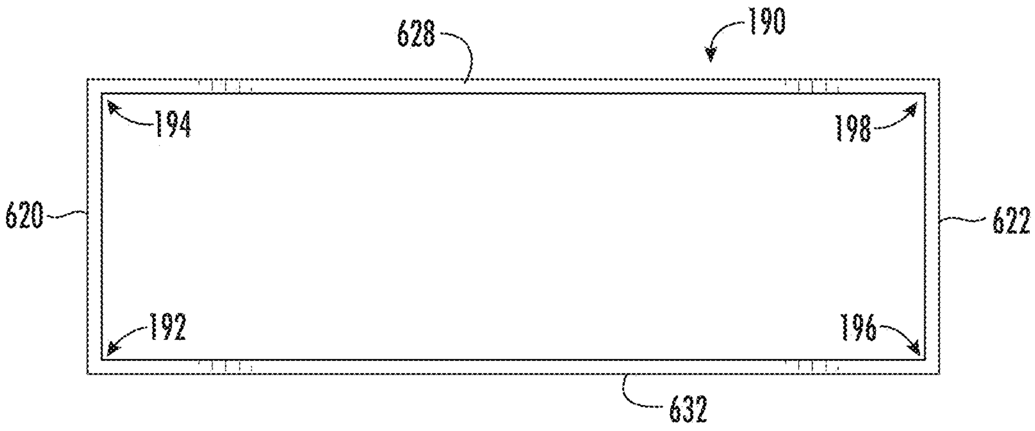
FIG. 5A depicts a front view of a first side inner roof frame of the portable foldable blind constructed in accordance with one embodiment of the invention.
Figure 5B:
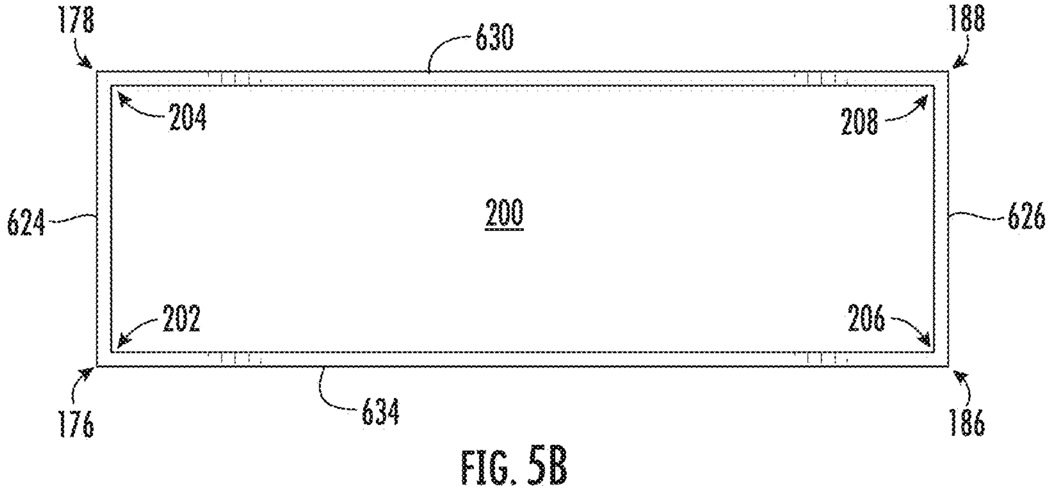
FIG. 5B depicts a front view of a second side inner roof frame of the portable foldable blind constructed in accordance with one embodiment of the invention.

As shown in FIGS. 5A and 5B, the foldable blind includes a rigid or semirigid generally rectangular first side roof inner frame 190 and a rigid or semirigid generally rectangular second side roof inner frame 200. The inner roof frames each are rigid or semirigid in circumference, and made at least in part by metal or composite or a similar material.

The first side roof inner frame 190 has a first side roof frame front top corner 192, a first side roof frame front bottom corner 194, a first side roof frame back top corner 196 and a first side roof frame back bottom corner 198. The second side roof inner frame 200 has a second side roof frame front top corner 202, a second side roof frame front bottom corner 204, a second side roof frame back top corner 206 and a second side roof frame back bottom corner 208.

As shown in FIGS. 5A, 5B and 18 and 22, the inner roof frame side edges 620, 622 of the first side roof inner frame 190 may support inner edges 320, 322 of the front and back first side fascia 150, 160. Similarly, inner roof frame side edges 624, 626 of the second side roof inner frame 200 may support inner edges 324, 326 of the front and back second side fascia 170, 180.

Thus, the front first side fascia inner edge 320 is pivotally connected to the first side front inner roof frame side edge 620, and the back first side fascia inner edge 322 is pivotally connected to the first side back inner roof frame side edge 622. Similarly, the front second side fascia inner edge 324 is pivotally connected to the second side front inner roof frame side edge 624, and the back second side fascia inner edge 326 is pivotally connected to the second side back inner roof frame side edge 626.

Alternatively, the front first side fascia outer top corner 156 and the front first side fascia outer bottom corner 158 are pivotally attached to the first side inner roof frame front top corner 192 and the first side inner roof frame front bottom corner 194, respectively. The back first side fascia outer top corner 166 and the back first side fascia outer bottom corner 168 are pivotally attached to the first side roof frame back top corner 196 and the first side roof frame back bottom corner 198, respectively.

Similar to the alternative embodiment above, regarding the second side roof inner frame 200, the front second side fascia outer top corner 176 and the front second side fascia outer bottom corner 178 are pivotally attached to the second side roof frame front top corner 202 the second side roof frame front bottom corner 204, respectively. The back second side fascia outer top corner 186 and the back second side fascia outer bottom corner 188 are pivotally attached to the second side roof frame back top corner 206 and the second side roof frame back bottom corner 208, respectively.

Figure 6A:
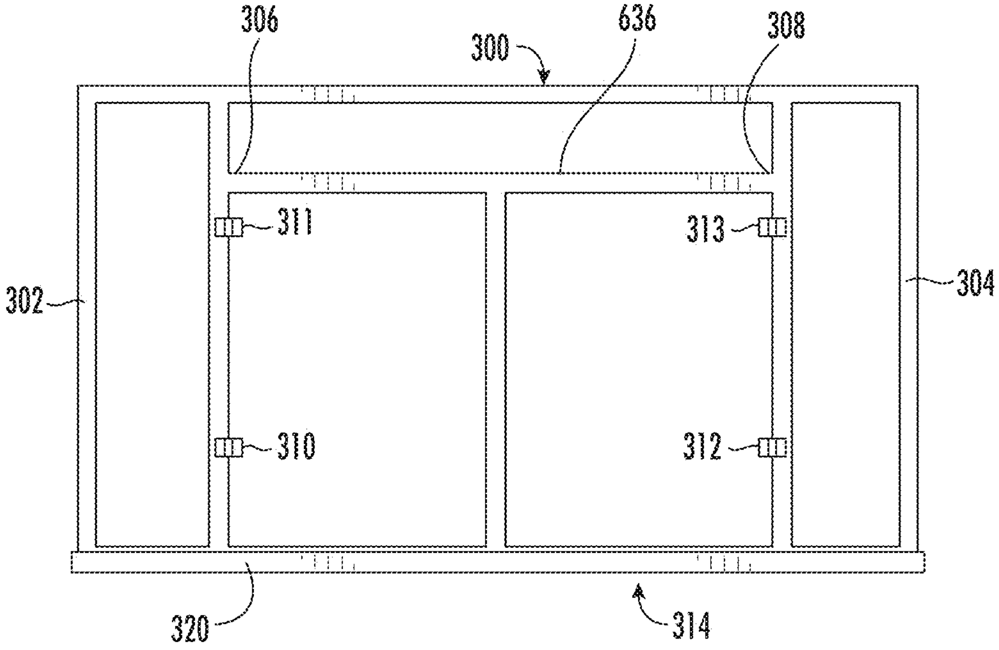
FIG. 6A depicts a front view of a first side outer roof frame of the portable foldable blind constructed in accordance with one embodiment of the invention.
Figure 6B:
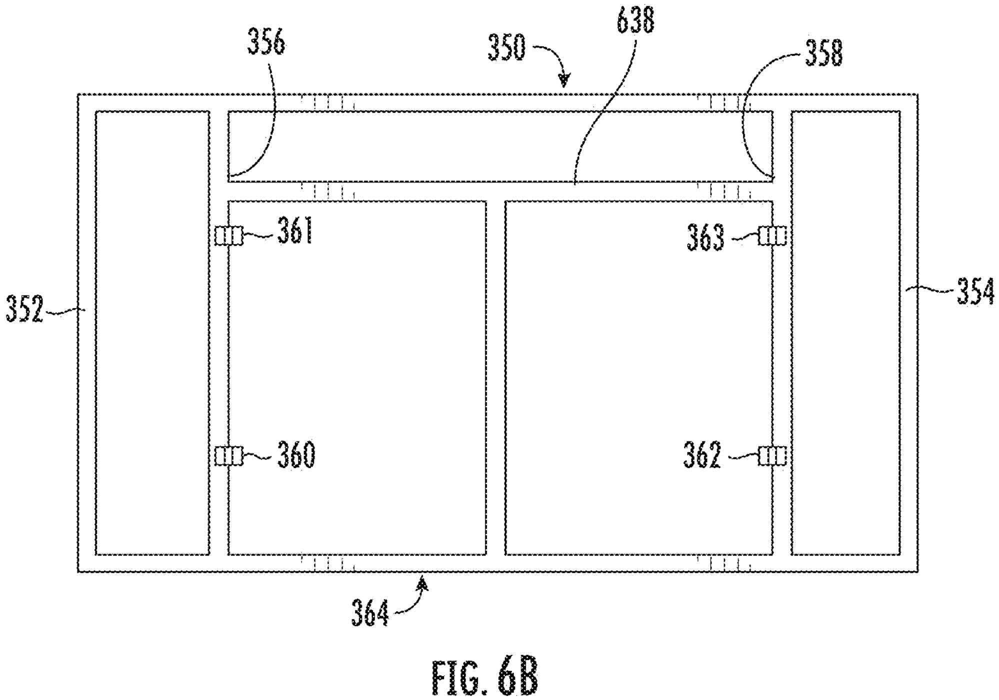
FIG. 6B depicts a front view of a second side outer roof frame of the portable foldable blind constructed in accordance with one embodiment of the invention.

As shown in FIGS. 6A and 6B, the portable foldable blind 10 further includes a first side outer roof frame 300 and a second side outer roof frame 350. The outer roof frames each are rigid or semirigid in circumference, and made at least in part by metal or composite or a similar material. Alternatively, either or both outer roof frames 300, 350 may include a panel attached to an outer surface of the outer roof frame 300, 350. The panel may be flexible or rigid, and may be transparent, translucent or opaque.

Figure 8:
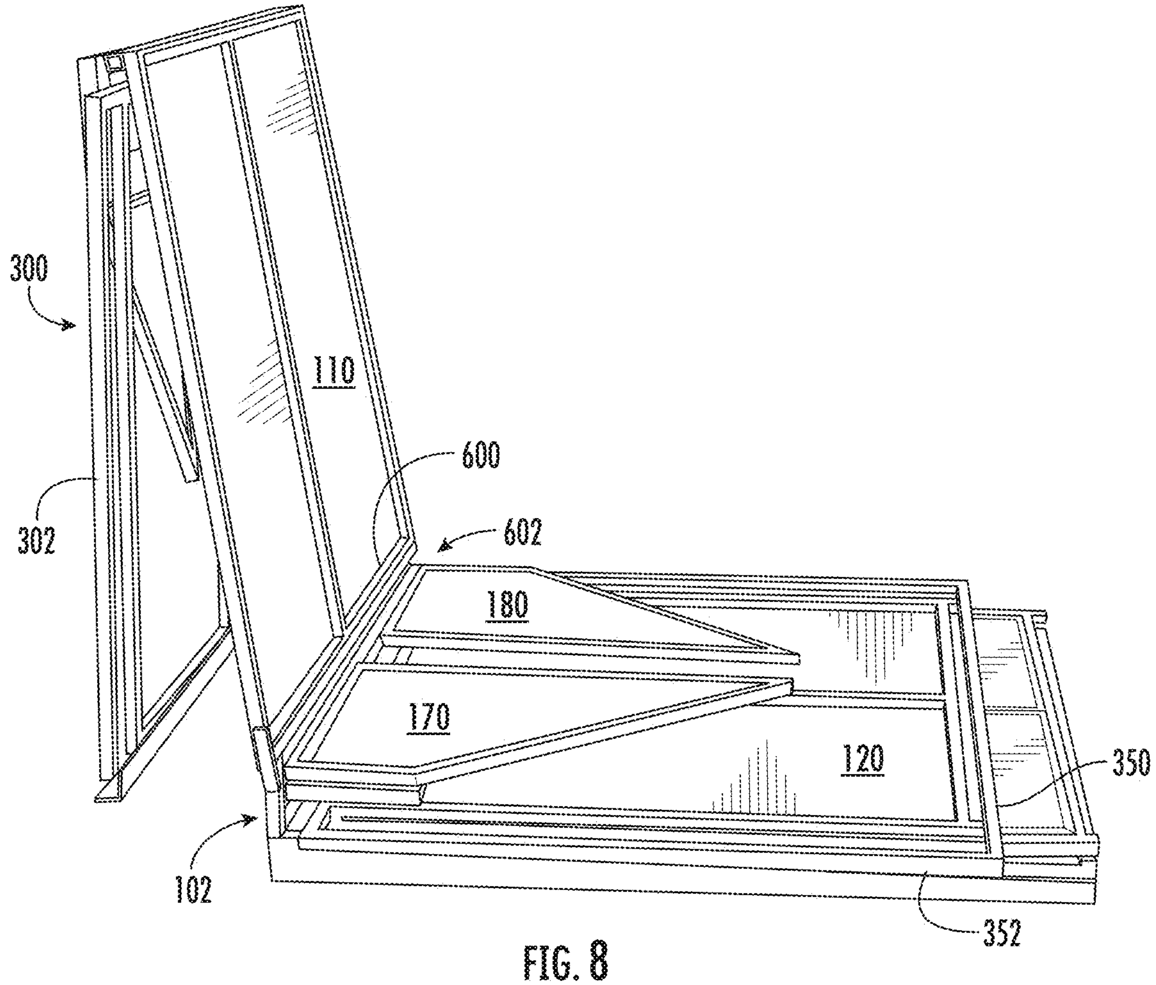
FIG. 8 depicts a front perspective view of the portable foldable blind constructed in accordance with one embodiment of the invention in a partially deployed configuration with a first side panel deployed.

In a preferred non-limiting embodiment, the outer roof frames 300, 350 are generally rectangular. Each of the outer roof frames has two handle portions, shown at 302 and 304 as well as 352 and 354, respectively. As shown in FIG. 8, in the folded configuration at least one of the handle portions of the outer roof frames 300, 350 extends in an outward direction horizontally from the frame 100.

These handle portions make foldable blind 10 easier for a user to deploy and to transport. As shown in FIGS. 6A and 6B, outer roof frames 300, 350 may each have respective outer roof frame pivot points 306 and 308 as well as 356 and 358 for pivotable attachment to the inner roof frames 190 and 200. Alternatively, outer roof frames 300, 350 may each have respective outer roof frame pivot members 636 and 638 for pivotable attachment to the inner roof frames 190 and 200.

The inner roof frames 190, 200 may have inner roof pivot edges 628, 630 which are pivotally attached to the first side top edge 632 and the second side top edge 634, respectively. The inner roof frames 190, 200 may also have roofing pivot edges 632, 634 which are pivotally attached to outer roof frame pivot members 636 and 638.

The outer roof frames 300, 350 may have outer roof pivot members 632, 634, so that the inner roof pivot edges 628, 630 are pivotally attached to the outer roof pivot members 632, 634, respectively.

Alternatively, the corners of the first side inner roof frame 194, 198 are pivotally attached to a first pivot point 306 and a second pivot point 308 of the first side outer roof frame 300. The corners of the second side inner roof frame 204, 208 are pivotally attached to a first pivot point 356 and a second pivot point 358 of the second side outer roof frame 350, as shown in FIG. 22.

Figure 12:
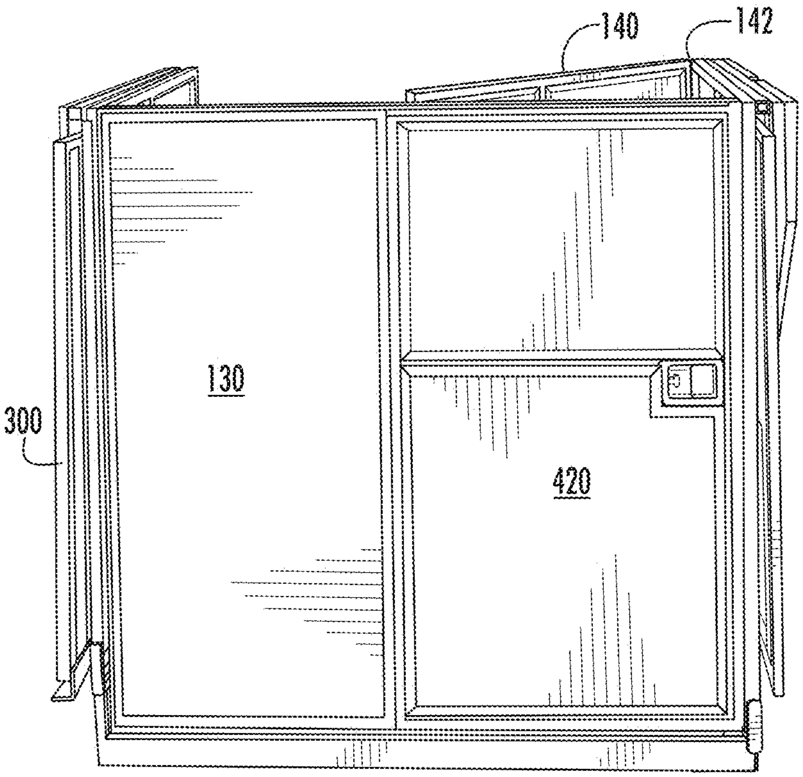
FIG. 12 depicts a front perspective view of the portable foldable blind constructed in accordance with one embodiment of the invention in a partially deployed configuration with a first side panel, a second side panel and a front panel deployed and a back panel partially deployed.
Figure 18:
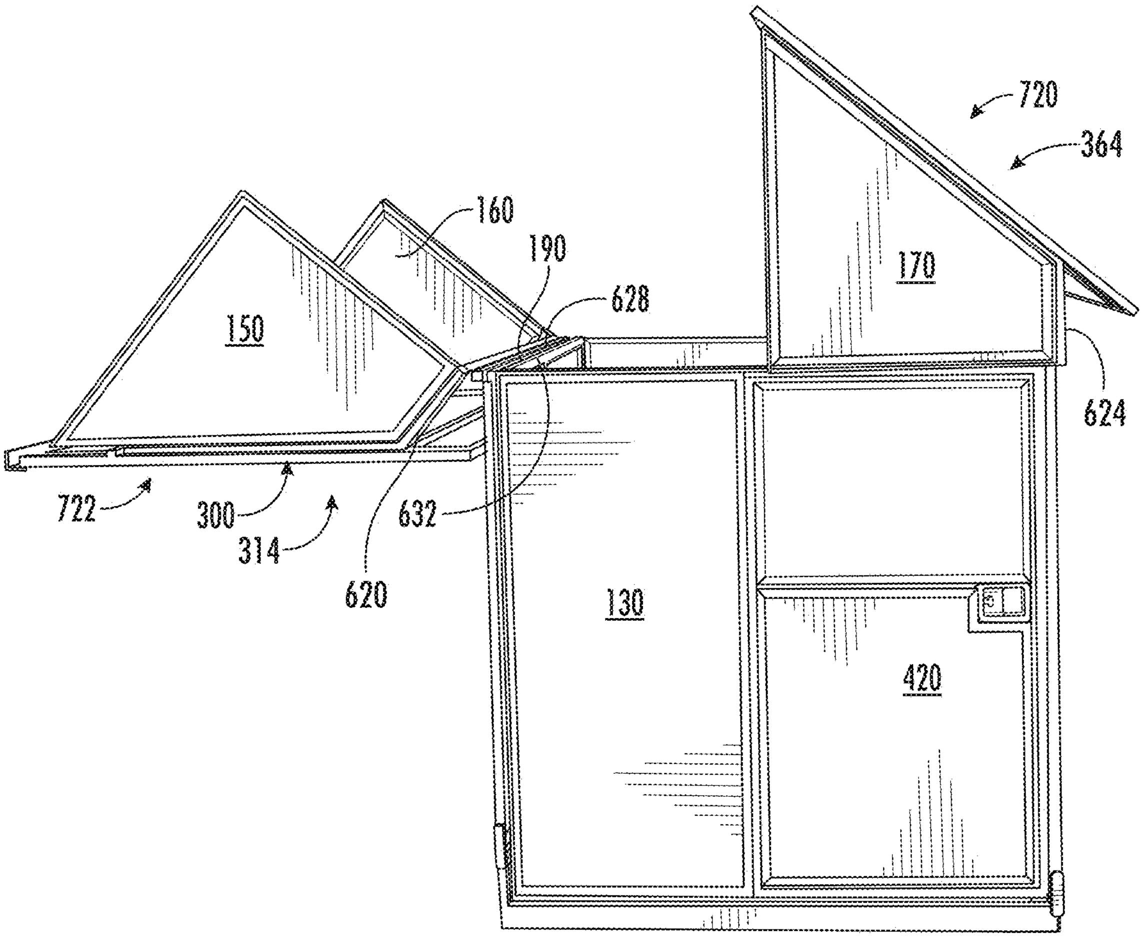
FIG. 18 depicts a front perspective view of the portable foldable blind constructed in accordance with one embodiment of the invention in a partially deployed configuration with a first side panel, a second side panel, a front panel, a back panel, second side fascias, a second side interior roof frame and a second side outer roof frame deployed and first side fascias partially deployed with the outer roof frame in a horizontal orientation.

The pivotal attachment of the inner roof frames 190, 200 and the outer roof frames 300, 350 provide a releasable pivotal attachment so that each of the outer roof frames 300, 350 may be placed in a horizontal orientation when frictionally releasably attached to the first side panel 110 and the second side panel 120 respectively, as shown in FIG. 18. The outer roof frames may also be fully lowered as shown in FIG. 12 or fully raised as shown in FIGS. 1A through 1C.

Outer roof frames 300, 350 include respective fascia attachment points 310, 311. 312 and 313 as well as 360, 361, 362, and 363. The first side fascia attachment points 310, 311, 312, 313 allow the first side fascia 150, 160 to be pivoted into rigid connection with the first side outer roof frame 300. The second side fascia attachment points 360, 361, 362, 363 allow the second side fascia 170, 180 to be pivoted into rigid connection with the second side outer roof frame 350.

Figure 19:
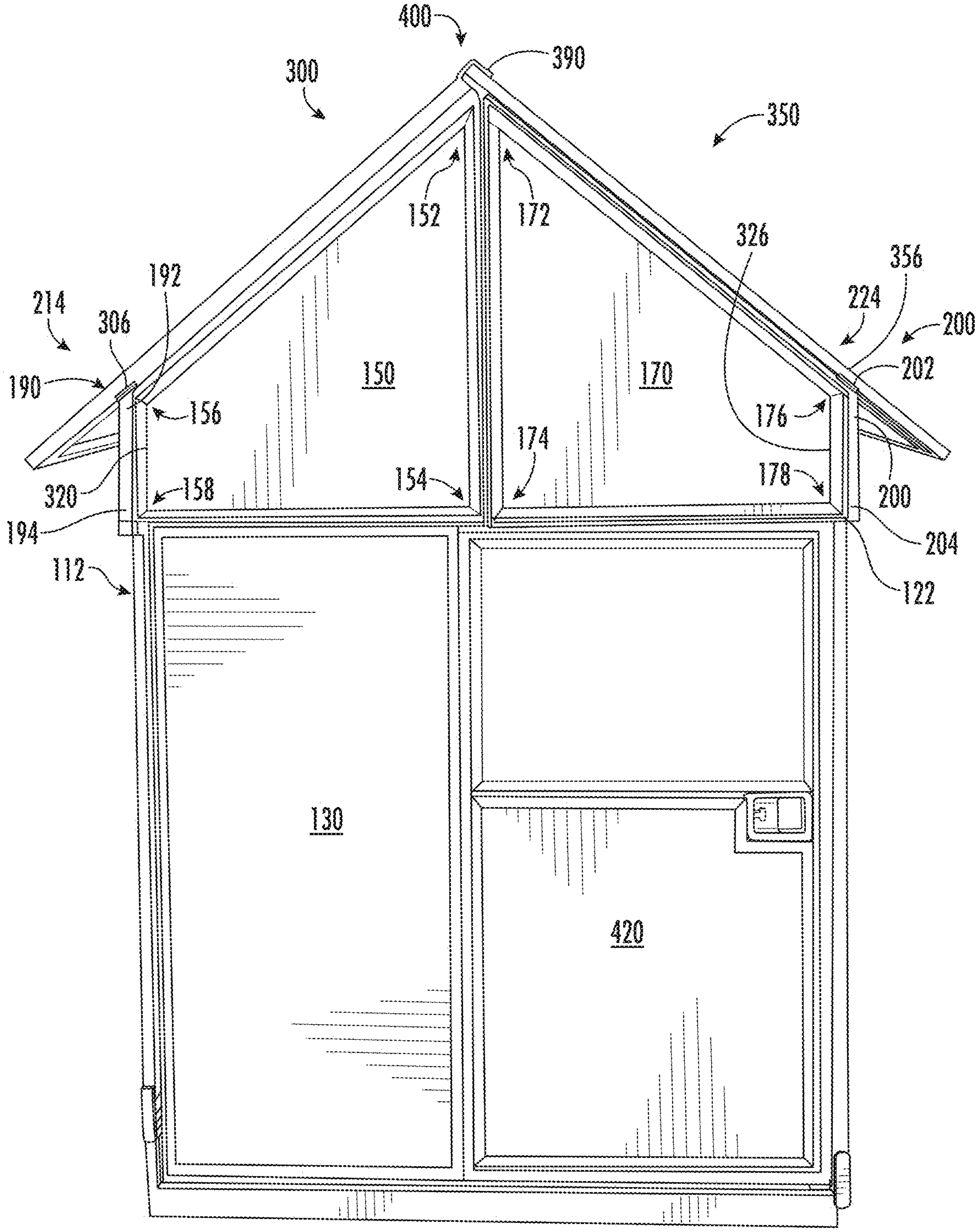
FIG. 19 depicts a front elevation view of a fully deployed portable foldable blind constructed in accordance with one embodiment of the invention.

As shown in FIGS. 18 and 19, respective outer edges 314, 364 of the outer roof frames 300, 350 form a bridge 400 releasably connecting the roof frames 300, 350 at the top of the foldable blind 10 which blind 10 is in its deployed configuration. As shown in FIG. 1A, in one embodiment, a flange 390 is located on an outer edge of the first side outer roof frame 300. However, one or more flanges may be used, and alternatively one or more flanges may be located on the second side roof frame 350. Other means known in the art for connecting the outer roof frames 300, 350 to form a bridge 400 are also contemplated.

Also, as shown in FIG. 18, and as further detailed herein, the first side outer roof frame 300 is configured so that it is frictionally releasably connected to the first side 110 in a horizontal orientation. Similarly, the second side outer roof frame 350 may also be configured so that it is also frictionally releasably connected to the second side 120 in a horizontal orientation. The ability to configure an outer roof frame to a horizontal orientation makes it easier for a user to deploy or fold the fascia as the foldable blind is changed in configuration. Furthermore, the horizontal orientation of one or more of the outer roof frames 200, 250 provides a user with the ability to use the foldable blind 10 without some or all of the roofing, if desired by the user. The user would be hidden by one or more of the sides 110, 120, 130, 140 while standing inside the partially deployed foldable blind 10.

Figure 7:
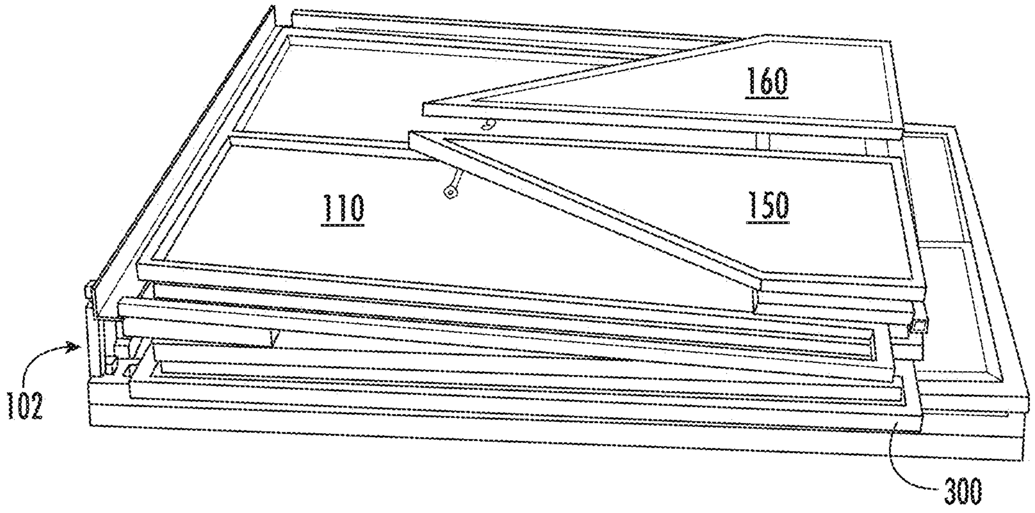
FIG. 7 depicts a perspective view of the portable foldable blind constructed in accordance with one embodiment of the invention in a folded configuration.
Figure 11:
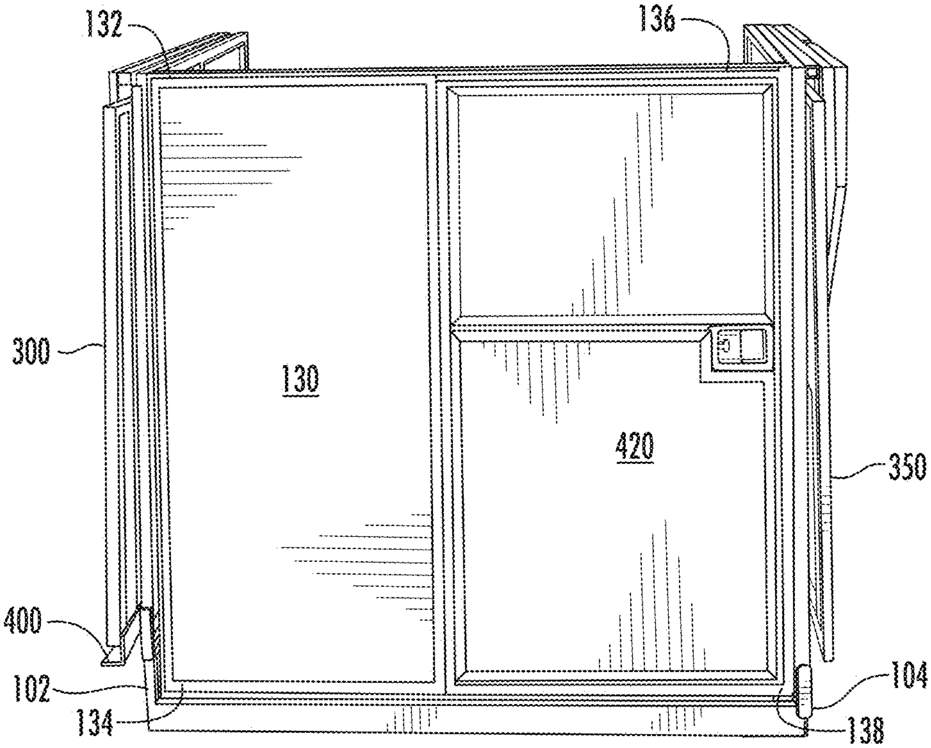
FIG. 11 depicts a front perspective view of the portable foldable blind constructed in accordance with one embodiment of the invention in a partially deployed configuration with a first side panel, a second side panel and a front panel deployed.
Figure 13:
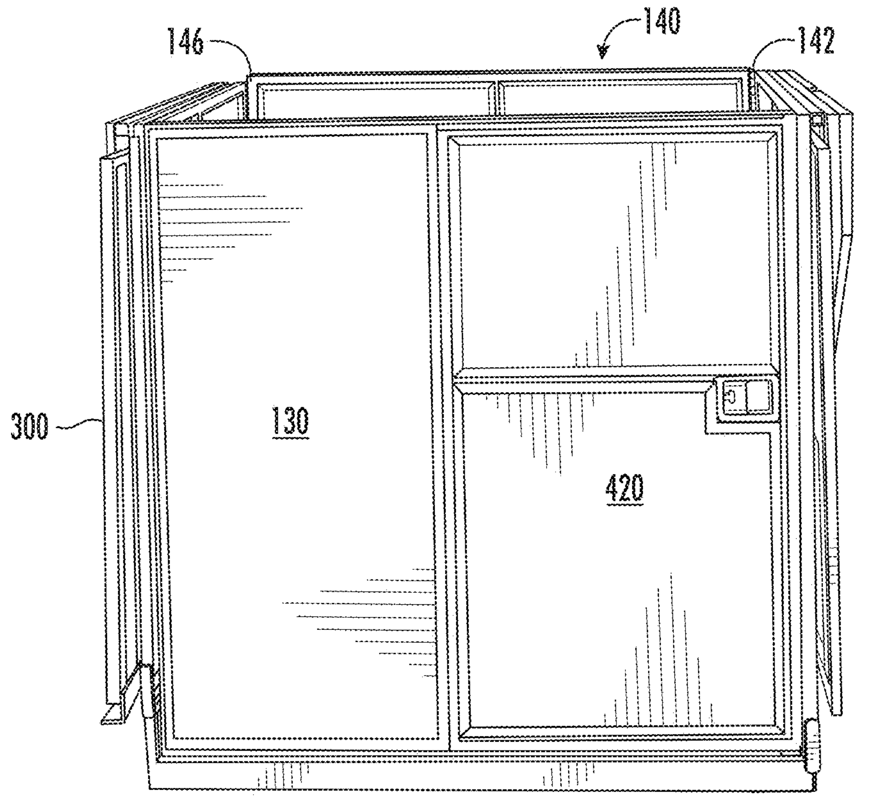
FIG. 13 depicts a front perspective view of the portable foldable blind constructed in accordance with one embodiment of the invention in a partially deployed configuration with a first side panel, a second side panel, a front panel and a back panel deployed.
Figure 14:
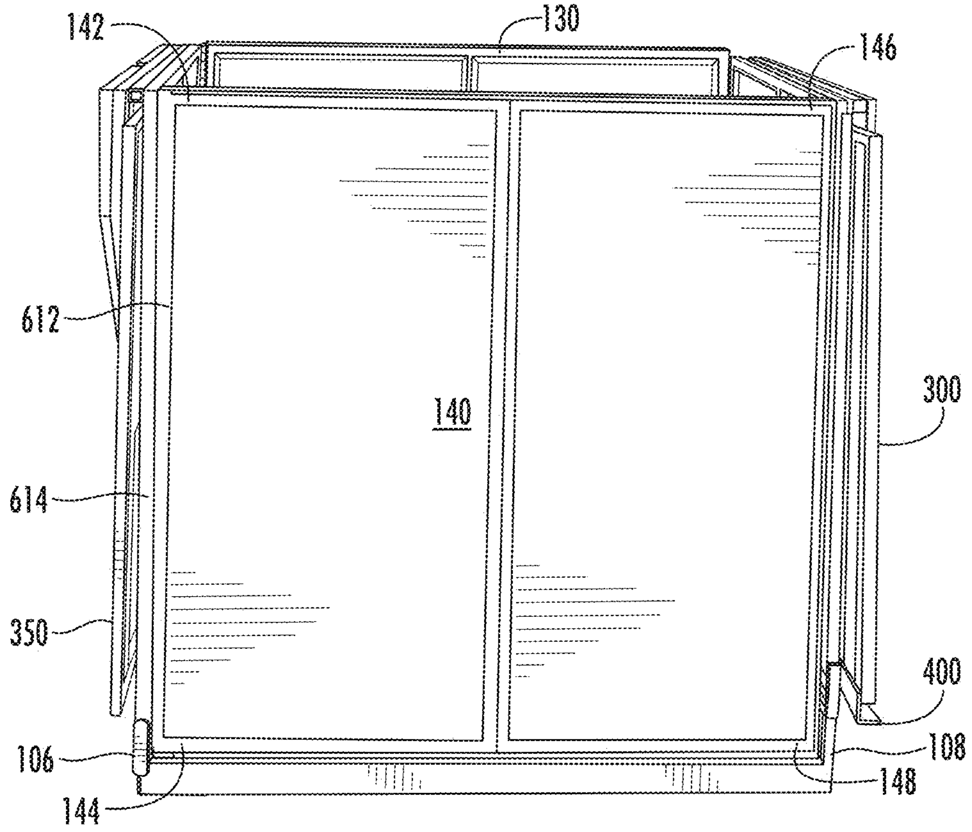
FIG. 14 depicts a rear perspective view of the portable foldable blind constructed in accordance with one embodiment of the invention in a partially deployed configuration with a first side panel, a second side panel, a front panel and a back panel deployed.

Deploying the foldable blind 10 in one non-limiting embodiment is described herein and illustrated in FIGS. 7 through 19. First, the foldable blind 10 is conveyed to a desired spot in the folded configuration as shown in FIG. 7. The first side 110 is rotated about the first side edge 602 of the bottom frame 100 as shown in FIG. 7. The first side 110 may extend past a vertical orientation to allow the front side 130 and the back side 140 to be fully extended so they may be secured to the first side 110. The second side 120 is rotated about the second side edge 606 of the bottom frame 100 and deployed as shown as shown in FIG. 9 and secured in place to the bottom frame 100. Securement as described in this application may be made by a pins, latches, ties, or other means for securement known in the art. The front side 130 is then rotated about the front edge 610 of the second side panel 120 and deployed as shown in FIGS. 10 and 11 and then secured in place to the first side 110 and the second side 120. The back side 140 is then back edge 614 of the second side 120 and deployed as shown in FIGS. 12 through 14.

Figure 15:
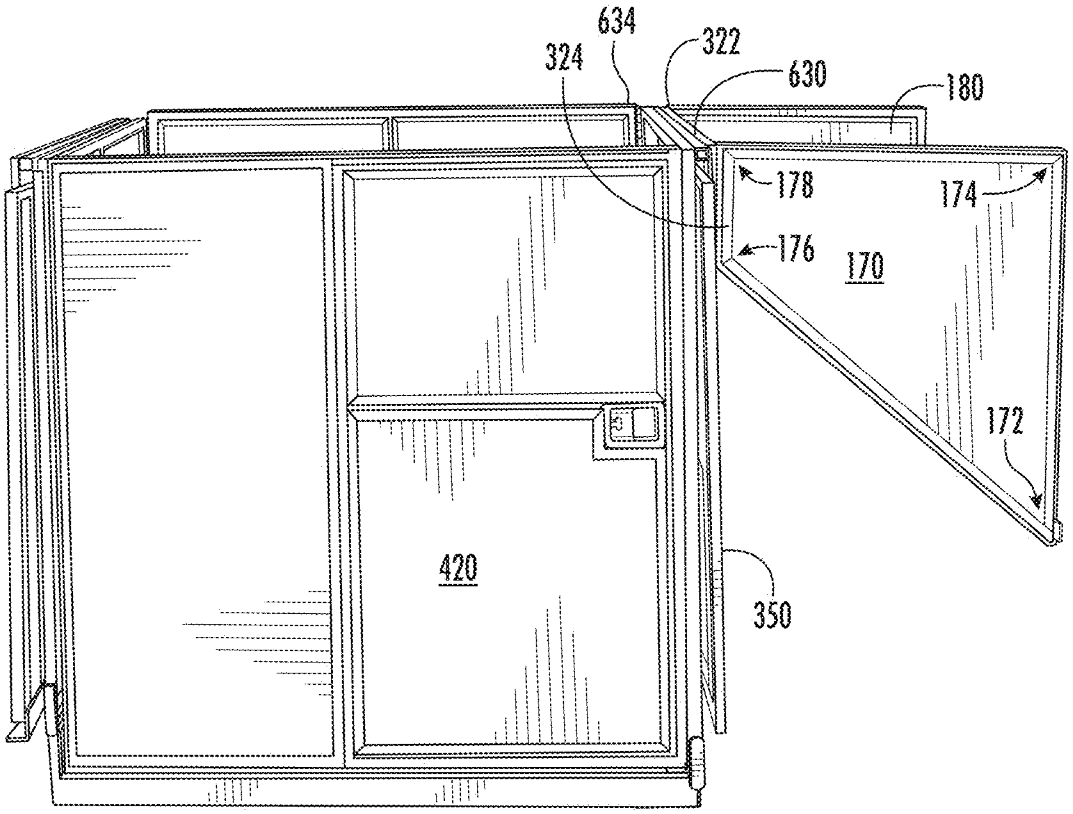
FIG. 15 depicts a front perspective view of the portable foldable blind constructed in accordance with one embodiment of the invention in a partially deployed configuration with a first side panel, a second side panel, a front panel and a back panel deployed and second side fascias partially deployed.
Figure 16:
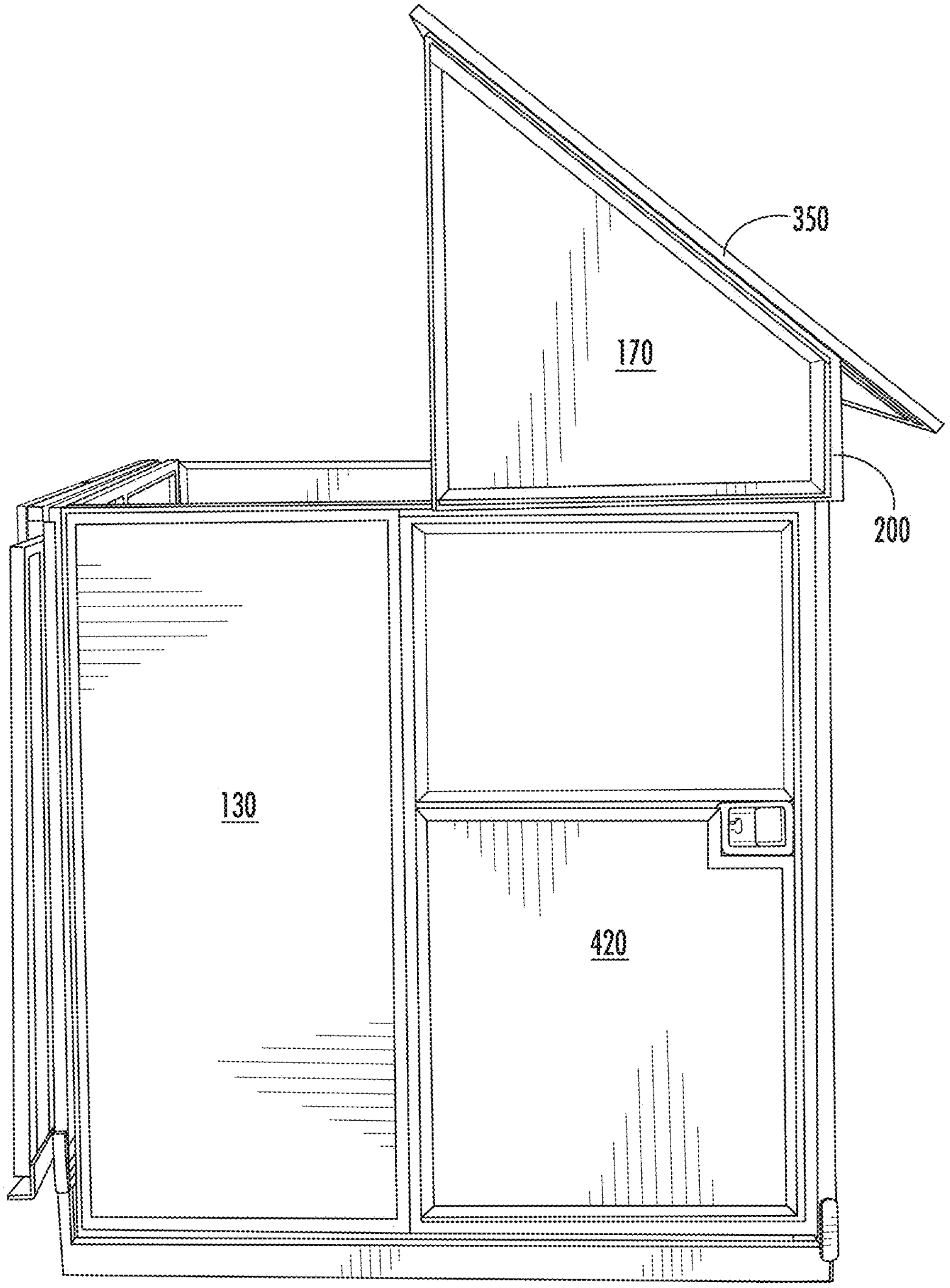
FIG. 16 depicts a front perspective view of the portable foldable blind constructed in accordance with one embodiment of the invention in a partially deployed configuration with a first side panel, a second side panel, a front panel, a back panel, second side fascias, a second side interior roof frame and a second side outer roof frame deployed.
Figure 17:
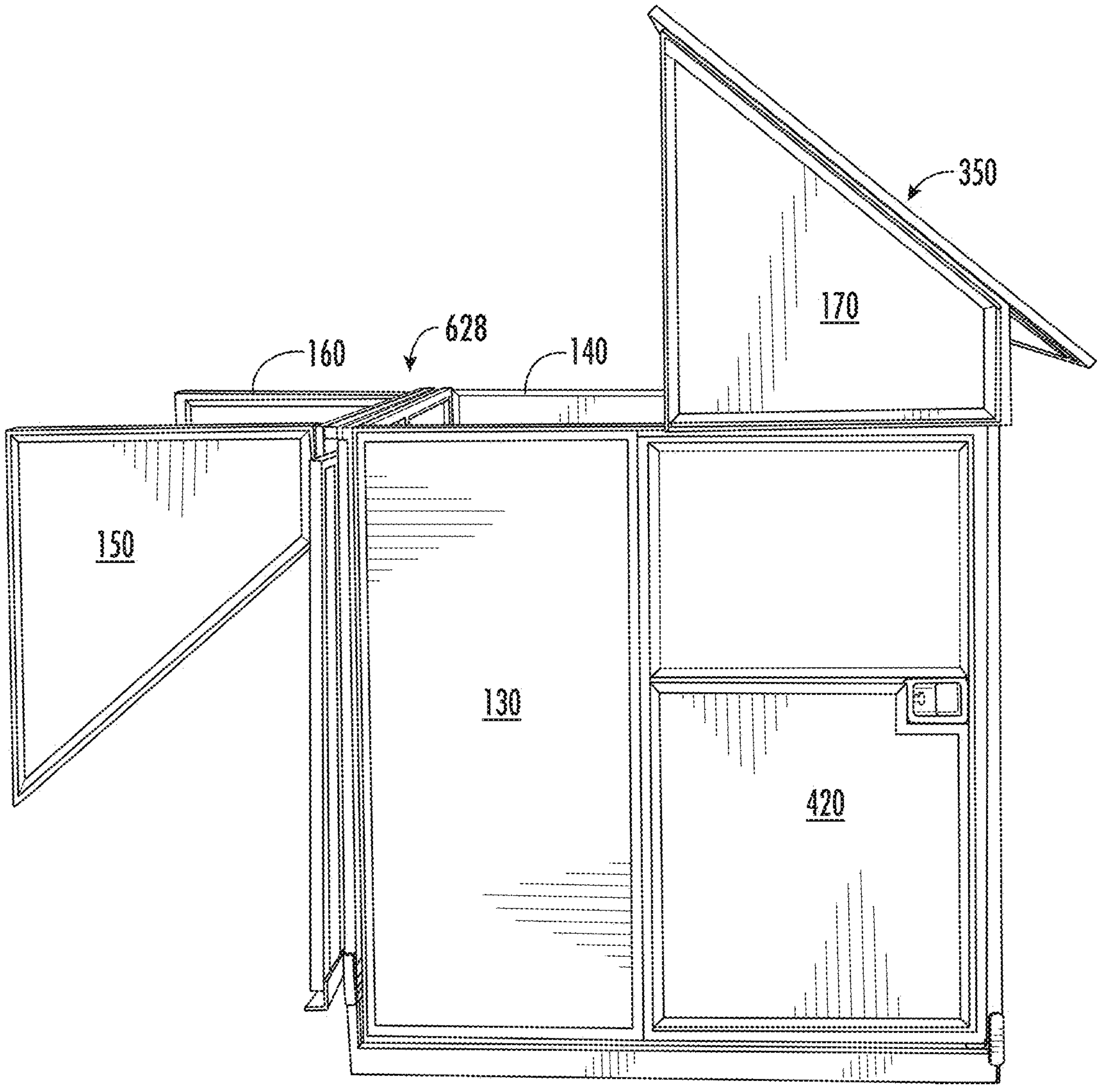
FIG. 17 depicts a front perspective view of the portable foldable blind constructed in accordance with one embodiment of the invention in a partially deployed configuration with a first side panel, a second side panel, a front panel, a back panel, second side fascias, a second side interior roof frame and a second side outer roof frame deployed and first side fascias partially deployed.

The second side fascia 170 and 180 are then deployed on the second side inner roof frame 200 as shown in FIG. 15. The second side outer frame 350 is capable of being raised to a horizontal orientation as shown in FIG. 18 for the first side inner roof frame 190. The second side outer frame is then raised to the form a roof section 720 of the deployed foldable blind as shown in FIG. 17. A second roof section 722 is then formed on the opposite side of the blind 10 as illustrated in FIGS. 18 and 19. The forming of a roof section may begin initially on the first side, or each portion may be deployed simultaneously on each side of the blind 10.

The horizontal orientation of the outer frames 300, 350 puts the fascia 150, 160, 170, 180 within easier reach for a user so that a user may fix the fascia 150, 160, 170, 180 to the corresponding outer frame 300, 350 at the respective fascia attachment points 310, 312, 360, 362. The second side outer frame 350 is then raised to the form a roof section 720 of the deployed foldable blind 10 as shown in FIG. 18. This process for forming a roof section is then repeated on the first side as illustrated in FIGS. 18 and 19 to form a second roof section 722. The forming of a roof section may begin initially on the either side, or roof sections may be deployed simultaneously on the first side and the second side.

In alternative embodiments, a door section 420 may be included in at least one of the front panel, back panel, first side panel and second side panel.

Alternatively, when the portable foldable blind is in the folded configuration, the handle portion outer edges of at least one of the first side outer roof frame 302, 304 and the second side outer roof frame 352, 354 extend in an outward direction 410 from the first side panel.

While various aspects of the portable foldable blind have been provided in the foregoing description, those skilled in the art may make modifications and alterations to these aspects without departing from the scope and spirit of the disclosure. For example, it is to be understood that this disclosure contemplates that, to the extent possible, one or more features of any aspect may be combined with one or more features of any other aspect. Accordingly, the foregoing description is intended to be illustrative rather than restrictive. The invention described hereinabove is defined by the appended claims and all changes to the invention that fall within the meaning and the range of equivalency of the claims are to be embraced within their scope.

What is claimed is:

1. A portable foldable blind having a deployed position and a folded position, and a transition between the deployed position and the folded position, comprising:

a bottom frame, having a frame front first corner, a frame front second corner, a frame back first corner, a frame back second corner;

a first side panel, having a first side panel front top corner, a first side panel front bottom corner, a first side panel back top corner, a first side panel back bottom corner, the first side panel being pivotally attached to the bottom frame;

a second side panel, having a second side panel front top corner a second side panel front bottom corner, a second side panel back top corner, a second side panel back bottom corner, the second side panel being pivotally attached to the bottom frame;

a front panel, having a front panel first side top corner, a front panel first side bottom corner, a front panel second side top corner, a front panel second side bottom corner, the front panel being pivotally attached to the second side panel;

a back panel, having a back panel first side top corner, a back panel first side bottom corner, a back panel second side top corner, a back panel second side bottom corner, the front panel being pivotally attached to the second side panel;

a front first side fascia, having a front first side fascia inner top corner, a front first side fascia inner bottom corner, a front first side fascia outer top corner, a front first side fascia outer bottom corner and a front first side fascia inner edge;

a back first side fascia, having a back first side fascia inner top corner, a back first side fascia inner bottom corner, a back first side fascia outer top corner, a back first side fascia outer bottom corner and a back first side fascia inner edge;

a front second side fascia, having a front second side fascia inner top corner, a front second side fascia inner bottom corner, a front second side fascia outer top corner, a front second side fascia outer bottom corner and a front second side fascia inner edge;

a back second side fascia, having a back second side fascia inner top corner, a back second side fascia inner bottom corner, a back second side fascia outer top corner, a back second side fascia outer bottom corner and a back second side fascia inner edge;

a first side inner roof frame, having a first side inner roof frame front top corner, a first side inner roof frame front bottom corner, a first side inner roof frame back top corner, a first side inner roof frame back bottom corner, a first side front inner roof frame side edge and a first side back inner roof frame side edge, the first side inner roof frame being pivotally affixed to the first side panel, the front first side fascia being pivotally affixed to the first side inner roof frame, and the back first side fascia being pivotally affixed to the first side inner roof frame;

a second side inner roof frame, having a second side inner roof frame front top corner, a second side inner roof frame front bottom corner, a second side inner roof frame back top corner, a second side inner roof frame back bottom corner, a second side front inner roof frame side edge and a second side back inner roof frame side edge; the second side inner roof frame being pivotally affixed to the second side panel, the front second side fascia being pivotally affixed to the second side inner roof frame, and the back second side fascia being pivotally affixed to the second side inner roof frame;

a first side outer roof frame, having a first side outer roof frame first pivot point and a first side outer roof frame second pivot point a first side outer roof frame front top corner, a first side outer roof frame front bottom corner, a first side outer roof frame back top corner, a first side outer roof frame back bottom corner, the first side outer roof frame being pivotally affixed to the first side inner roof frame; and a second side outer roof frame, having a second side outer roof frame first pivot point and a second side outer roof frame second pivot point, a second side outer roof frame front top corner, a second side outer roof frame front bottom corner, a second side outer roof frame back top corner, a second side outer roof frame back bottom corner, the second side outer roof frame being pivotally affixed to the second side inner roof frame.

2. The portable foldable blind according to claim 1, wherein the front panel second side top corner is pivotally attached to the second side panel front top corner, and the a front panel second side bottom corner is pivotally attached to the second side panel front bottom corner.

3. The portable foldable blind according to claim 1, wherein the back panel second side top corner is pivotally attached to the second side panel back top corner, and the back panel second side bottom corner is pivotally attached to the second side panel back bottom corner.

4. The portable foldable blind according to claim 1, wherein the first side panel front top corner is pivotally attached to the first side inner roof frame front top corner, and the first side panel back top corner is pivotally attached to the first side inner roof frame back top corner, and wherein the second side panel front top corner is pivotally attached to the second side inner roof frame front top corner, and the second side panel back top corner is pivotally attached to the second side inner roof frame back top corner.

5. The portable foldable blind according to claim 1, wherein the first side inner roof frame front bottom corner is pivotally attached to the first side outer roof frame first pivot point, and the first side inner roof frame back bottom corner is pivotally attached to the first side outer roof frame second pivot point, and the second side inner roof frame front bottom corner is pivotally attached to the second side outer roof frame first pivot point, and the second side inner roof frame back bottom corner is pivotally attached to the second side outer roof frame second pivot point.

6. The portable foldable blind according to claim 4, wherein the first side inner roof frame further comprises a first side roofing pivot edge and the second side inner roof frame further comprises a second side roofing pivot edge, and the first side outer roof frame further comprises a first side outer roof pivot member and the second side outer roof frame further comprises a second side outer roof pivot member, wherein the first side inner roof pivot edge is pivotally connected to the first side outer roof pivot member, and wherein the second side inner roof pivot edge is pivotally connected to the second side outer roof pivot member.

7. The portable foldable blind according to claim 1, wherein the front first side fascia inner edge is pivotally connected to the first side front inner roof frame side edge, wherein the back first side inner edge is pivotally connected to the first side back inner roof frame side edge, wherein the front second side fascia inner edge is pivotally connected to the second side front inner roof frame side edge, and wherein the back second side inner edge is pivotally connected to the second side back inner roof frame side edge.

8. The portable foldable blind according to claim 5, wherein the front first side fascia inner edge is pivotally connected to the first side front inner roof frame side edge, wherein the back first side inner edge is pivotally connected to the first side back inner roof frame side edge, wherein the front second side fascia inner edge is pivotally connected to the second side front inner roof frame side edge, and wherein the back second side inner edge is pivotally connected to the second side back inner roof frame side edge.

9. The portable foldable blind according to claim 6, wherein the front first side fascia inner edge is pivotally connected to the first side front inner roof frame side edge, wherein the back first side inner edge is pivotally connected to the first side back inner roof frame side edge, wherein the front second side fascia inner edge is pivotally connected to the second side front inner roof frame side edge, and wherein the back second side inner edge is pivotally connected to the second side back inner roof frame side edge.

10. The portable foldable blind according to claim 1, wherein during the transition of the portable foldable blind to or from the folded position, the first side outer roof frame is releasably frictionally connected to the first side.

11. The portable foldable blind according to claim 10, wherein during the transition of the portable foldable blind to or from the folded position, the second side outer roof frame is releasably frictionally connected to the second side.

12. The portable foldable blind according to claim 11, wherein at least one of the first side outer roof frame and the second side outer roof frame includes at least one handle portion.

13. The portable foldable blind according to claim 12, wherein in the folded position, at least one of the handle portions extends in an outward direction horizontally from the frame.

14. The portable foldable blind according to claim 1, wherein the bottom frame front first corner and the bottom frame back first corner extend vertically higher than the bottom frame front second corner and the bottom frame back second corner.

15. The portable foldable blind according to claim 14, wherein in the folded position the portable blind has a first folded side having a first folded side height, and a second folded side having a second folded side height, and the first folded side height and the second folded side height are approximately equal.

16. The portable foldable blind according to claim 1, wherein at least one of the front panel, back panel, first side panel and second side panel includes a door panel.

17. The portable foldable blind according to claim 1, further comprising a an outer frame panel located on at least one of the first side outer roof frame and the second side outer roof frame.

* * * * *